(12) United States Patent
Moerbe

(10) Patent No.: US 11,618,522 B2
(45) Date of Patent: Apr. 4, 2023

(54) METHOD AND APPARATUS FOR OPERATING A DRIVER ASSISTANCE SYSTEM FOR A TWO-WHEELED VEHICLE

(71) Applicant: Robert Bosch GmbH, Stuttgart (DE)

(72) Inventor: Matthias Moerbe, Ilsfeld-Helfenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 306 days.

(21) Appl. No.: 16/625,073

(22) PCT Filed: Apr. 19, 2018

(86) PCT No.: PCT/EP2018/059993
§ 371 (c)(1),
(2) Date: Dec. 20, 2019

(87) PCT Pub. No.: WO2018/233901
PCT Pub. Date: Dec. 27, 2018

(65) Prior Publication Data
US 2020/0148294 A1 May 14, 2020

(30) Foreign Application Priority Data
Jun. 22, 2017 (DE) .......... 102017210500.3

(51) Int. Cl.
*B62J 45/20* (2020.01)
*B62J 45/414* (2020.01)
*B62L 3/00* (2006.01)
(52) U.S. Cl.
CPC ............. *B62J 45/20* (2020.02); *B62J 45/414* (2020.02); *B62L 3/00* (2013.01)

(58) Field of Classification Search
CPC ............. B62J 45/20; B62J 45/414; B62L 3/00
See application file for complete search history.

(56) References Cited

U.S. PATENT DOCUMENTS

| | | | |
|---|---|---|---|
| 5,521,823 A * | 5/1996 | Akita | B60W 10/10 701/1 |
| 6,549,841 B1 * | 4/2003 | AxElsson | B60T 7/22 701/70 |

(Continued)

FOREIGN PATENT DOCUMENTS

| | | |
|---|---|---|
| CN | 1412523 A | 4/2003 |
| CN | 1610626 A | 4/2005 |

(Continued)

OTHER PUBLICATIONS

International Search Report for PCT/EP2018/059993, dated Jul. 9, 2018.

*Primary Examiner* — Daniel L Greene
(74) *Attorney, Agent, or Firm* — Norton Rose Fulbright US LLP; Gerard Messina

(57) ABSTRACT

A method for operating a driver assistance system for a two-wheeled vehicle, which is characterized in that in an intervention step, the driver assistance system intervenes as a function of a driver-specific driving-dynamics profile and an instantaneous driving state, the driving-dynamics profile reflecting a relationship between inclined-position values at which a driver of the two-wheeled vehicle drove in the past and acceleration values at which he drove at the same time, and the driving state being characterized by an instantaneously acquired acceleration value and an instantaneously acquired inclined-position value.

26 Claims, 1 Drawing Sheet

(56) References Cited

U.S. PATENT DOCUMENTS

| | | | | |
|---|---|---|---|---|
| 2003/0132837 | A1* | 7/2003 | Hasegawa | G01C 9/06 340/440 |
| 2005/0045398 | A1* | 3/2005 | Suzuki | B62K 11/00 180/209 |
| 2008/0208416 | A1* | 8/2008 | Yuet | B60W 30/04 340/440 |
| 2009/0210257 | A1* | 8/2009 | Chalfant | B60W 40/09 705/4 |
| 2014/0129088 | A1* | 5/2014 | Meissner | B60W 10/18 701/41 |
| 2014/0142395 | A1* | 5/2014 | Sattler | A61B 5/725 128/204.23 |
| 2018/0194349 | A1* | 7/2018 | McGill, Jr. | B60W 30/10 |
| 2019/0023264 | A1* | 1/2019 | Mizutani | B60T 8/1706 |
| 2019/0329793 | A1* | 10/2019 | Schwabe | B60K 35/00 |

FOREIGN PATENT DOCUMENTS

| | | | |
|---|---|---|---|
| DE | 102005059216 A1 | 1/2007 | |
| DE | 102012201802 A1 | 8/2013 | |
| DE | 102013225751 A1 | 6/2015 | |
| JP | 2004099026 A | 4/2004 | |
| JP | 2011201539 A | 10/2011 | |
| JP | 2013209047 A | 10/2013 | |
| WO | WO-0130595 A1 * | 5/2001 | ......... B60C 23/0408 |
| WO | 2012086289 A1 | 6/2012 | |
| WO | WO-2013117275 A1 * | 8/2013 | ...... B60W 30/18145 |

\* cited by examiner ered when the driver assistance system is intervening.

METHOD AND APPARATUS FOR OPERATING A DRIVER ASSISTANCE SYSTEM FOR A TWO-WHEELED VEHICLE

FIELD OF THE INVENTION

The present invention relates to a method and an apparatus for operating a driver assistance system for a two-wheeled vehicle.

BACKGROUND INFORMATION

Multitrack vehicles are being fitted more widely with driver assistance systems. The driver assistance systems intervene in predetermined situations and influence braking devices at individual wheels of the vehicle, for example, in order to stabilize the vehicle and/or to keep it steerable. In the same way, driver assistance systems are able to intervene in an engine management of the vehicle and/or a steering system of the vehicle.

SUMMARY OF THE INVENTION

Against this background, the approach presented here introduces a method for operating a driver assistance system for a two-wheeled vehicle and an apparatus for operating a driver assistance system for a two-wheeled vehicle, as well as, finally, a corresponding computer-program product according to the independent claims. Advantageous further developments of and improvements to the approach presented here are described in the dependent claims.

Specific embodiments of the present invention may advantageously make it possible for similarly functioning driver assistance systems, like for tipping-resistant multitrack vehicles, to be used for single-track vehicles not resistant to tipping such as motorcycles, and inclinable multitrack vehicles like, e.g., three-wheelers with tilt technology, as well.

A method is introduced for operating a driver assistance system for a two-wheeled vehicle, which is characterized in that in an intervention step, the driver assistance system intervenes as a function of a driver-specific driving-dynamics profile and an instantaneous driving state, the driving-dynamics profile reflecting a relationship between inclined-position values at which a driver of the two-wheeled vehicle drove in the past and acceleration values at which he drove at the same time, and the driving state being characterized by an instantaneously acquired acceleration value and an instantaneously acquired inclined-position value.

In addition, an apparatus is presented for operating a driver assistance system for a two-wheeled vehicle, the apparatus being configured to carry out, implement and/or control the method according to the approach presented here, in suitable devices.

Ideas with respect to specific embodiments of the present invention may be regarded, inter alia, as based on the thoughts and findings described in the following.

A two-wheeled vehicle may be a motorcycle. Likewise, a two-wheeled vehicle may be a bicycle, motor scooter or motorized bicycle, or electric bicycle or E-bike. The approach presented here may be utilized in the case of multitrack vehicles with tilt technology, as well.

When driver assistance systems are supposed to intervene is dependent on stored threshold values. If fixed threshold values are used, the driver assistance systems react the same for every driver and under all conditions.

The same physical boundaries hold true for all drivers. For vehicles which are driven in inclined position in curves, the physical boundaries pertain above all to the road grip.

Different drivers drive very differently. For example, a personal driving style is dependent on personal driving skill and personal readiness to take risks. The personal driving style may be determined and reflected in a driving-dynamics profile. In this context, instantaneously acquired sensor data from sensors of the two-wheeled vehicle portray an instantaneous driving state. The sensor data are the basis for the driver-specific driving-dynamics profile. The driving-dynamics profile includes the inclined position and a longitudinal acceleration driven at the same time, thus, an acceleration in the direction of travel. Transverse accelerations are not very informative in the case of two-wheeled vehicles, since the transverse forces, thus, especially the centrifugal force through the inclined position together with the weight force, form a resultant force which acts along an axis through the center of gravity and a center of tire contact.

The driving-dynamics profile is made up of a multitude of individual driving states. The driving states yield a cloud of points in a two-dimensional space of events made of inclined position and longitudinal acceleration. The cloud of points has a greater density in areas of frequent driving states than in areas of infrequent driving states. The driving-dynamics profile is an envelope curve around the cloud of points, which encompasses a predefined percentage of the driving states. Driving states outside of the envelope curve may be referred to as outliers. The envelope curve may be adjusted if outliers occur more and more frequently, for example, if the driving style of the driver changes.

The driver assistance system may also intervene as a function of an instantaneous road condition. In this case, the road condition may represent an anticipated coefficient of friction between wheels of the two-wheeled vehicle and the roadway. When the roadway is wet, the friction between the rubber material of the wheels and the road paving is less than when the roadway is dry. The driver assistance system may intervene earlier if the roadway is wet, since a driving state which would still be normal if the roadway were dry, may already be critical.

The road condition may be determined using the driving-dynamics profile. For the determination, an occurrence frequency of driving states may be evaluated in terms of the driving-dynamics profile. The driver perceives the road condition and adjusts his driving style accordingly. The cloud of points of the driving states changes correspondingly. However, a form of the driving-dynamics profile remains essentially the same.

The driver assistance system is able to intervene if the instantaneous driving state represents an emergency situation. The emergency situation may be identified by a driving state recognizable as outlier in comparison to the driving-dynamics profile. The driving-dynamics profile represents a range of the driving states which the driver has command of repeatably. The emergency situation may be recognized if a driving state deviates by more than a predetermined factor from the driving-dynamics profile, since in this driving state, the driver is clearly outside of his comfort zone.

The driver assistance system may control a brake system of the two-wheeled vehicle. In that case, a default value may be provided for a brake pressure of the brake system as a function of the driving-dynamics profile and the driving state. The driver assistance system may have an emergency braking assist. The emergency braking assist may also be activated when the driver actuates the brake system faster in a driving state outside of the driving-dynamics profile than he does within the driving-dynamics profile.

The default value may be increased if the instantaneously acquired acceleration value is greater than an intervention boundary, specific to the driving-dynamics profile, for the instantaneously acquired inclined-position value. An intervention boundary may correspond to a driving-dynamics profile scaled by a scaling factor. Consequently, for each inclined-position value, the intervention boundary has an acceleration value, as of which the driver assistance system intervenes. The intervention boundary may change if the driving-dynamics profile changes.

The default value may be increased up to an instantaneous ABS-control boundary value. An ABS-control boundary value is determined by the road grip. When the brake system is operated with the ABS-control boundary value, a maximum possible deceleration is achieved.

The method may have a generating step, in which the driving-dynamics profile of the driver is generated using acceleration values and inclined-position values acquired during intervention-free travel. By recording driving states in which the driver assistance system has not intervened, it is possible to determine the driving style of the driver. The driving style may be detected continuously, and consequently may be matched to a form of the day and environmental conditions. In addition, older driving states may be discarded or weighted less heavily. The road condition may be determined by the continuous generating, as well.

Also advantageous is a computer-program product or computer program with program code, which may be stored on a machine-readable medium and is used to carry out, implement and/or control the steps of the method described above.

It is pointed out that some of the possible features and advantages of the invention are described herein with reference to different specific embodiments. One skilled in the art will recognize that the features of the method and of the apparatus may be combined, adapted or exchanged in suitable manner, in order to arrive at further specific embodiments of the invention.

Specific embodiments of the present invention are described hereinafter with reference to the attached drawing, neither the drawing nor the description to be interpreted as restrictive of the invention.

The figures are merely schematic and not true to scale. Identical reference numerals denote features that are identical or exercise essentially similar effects in the figures.

DETAILED DESCRIPTION

Emergency braking assists are well-known in the automobile. In that context, in case of emergency, dependent on the speed of the brake-pedal actuation, the brake pressure is increased up to the physical boundary, that is, up to the ABS control boundary value. As a result, the braking distance is able to be shortened, if the driver does not build up sufficiently high brake pressure.

Figure 1:
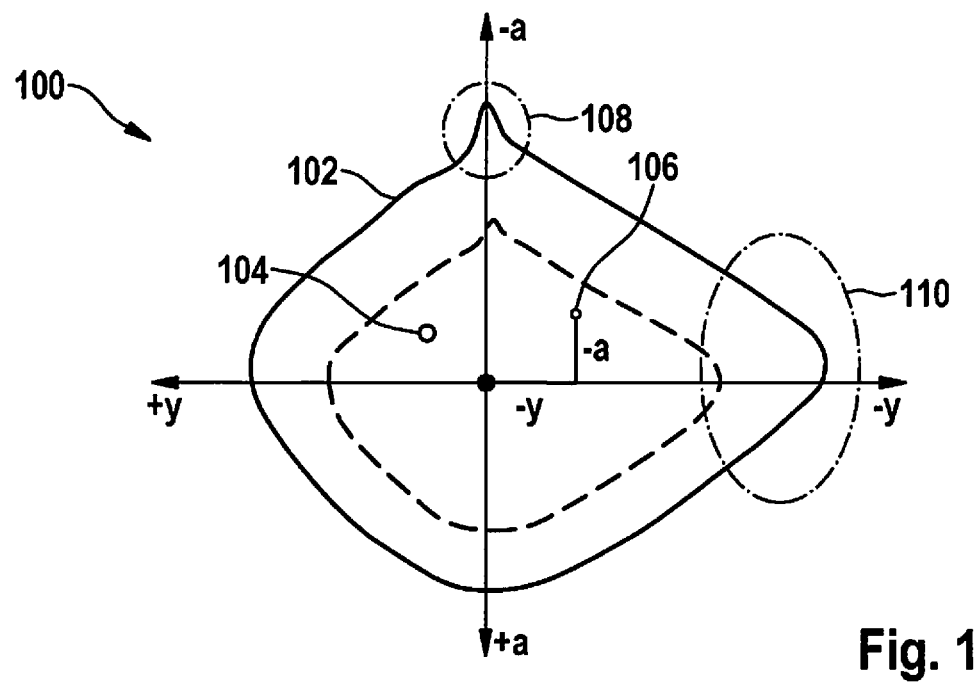
FIG. 1 shows a representation of a driving-dynamics profile of a driver of a motorcycle in the case of different road conditions.

FIG. 1 shows a representation of a driving-dynamics profile 100 of a driver of a motorcycle in the case of different road conditions. Every motorcyclist has a typical profile of driving dynamics, which is denoted here as driving-dynamics profile 100. These individual characteristics relate to braking and acceleration, as well as driving in curves.

Driving-dynamics profile 100 is represented in a diagram, which has acceleration values a during braking and acceleration, respectively, plotted on its ordinate and inclined-position values y for right-hand curves and left-hand curves, respectively, plotted on its abscissa. In this case, the coordinate origin lies at straight-ahead driving and acceleration-free rolling or standing. Inclined-position values y and acceleration values a are shown inverted, so that the braking is plotted here to the top and the left cornering is plotted to the right.

Driving-dynamics profile 100 is represented by a smoothed envelope curve 102 around a surface 104. A large portion of driving states 106 recorded during normal travel fall upon surface 104. Outliers lie outside of surface 104. A driving state 106 is characterized by an inclined-position value y and an acceleration value a. A size of surface 104 is a function of the road condition, e.g., rain or dry. The form is driver-specific. In addition, the size of surface 104 is dependent on the traffic conditions, the character of the roadway and the performance of the vehicle. The form, however, is a very individual property which the driver determines. The vehicle is able to ascertain this form with the aid of the built-in sensor system.

The driving style shown here is that of a driver who brakes very hard in straight-ahead driving, which is recognizable by maximum 108 of negative acceleration values a in the area of the ordinate. In addition, he travels left-hand curves 110 better and more rapidly than right-hand curves, which is recognizable by higher inclined-position values y.

It is possible to use the individual parameters from the vehicle data for other assistance functions, as well.

Driving-dynamics profile 100 characterizes a comfort zone of the driver. Within the comfort zone, the driver needs no assistance from a driver assistance system. During normal driving situations, the coordinate value of instantaneous driving state 106 remains within curve 102 of driving-dynamics profile 100. In a boundary situation or emergency situation, driving states 106 also occur outside of curve 102. In the approach presented here, the driver assistance system intervenes outside of curve 102, that is, outside of the comfort zone.

For example, a method is presented for the automated adjustment of the starting thresholds of an emergency braking assist for two-wheeled vehicles. The approach presented here allows the emergency braking assist to be utilized, e.g., for motorcycles and three-wheeled vehicles with cornering ability.

Figure 2:
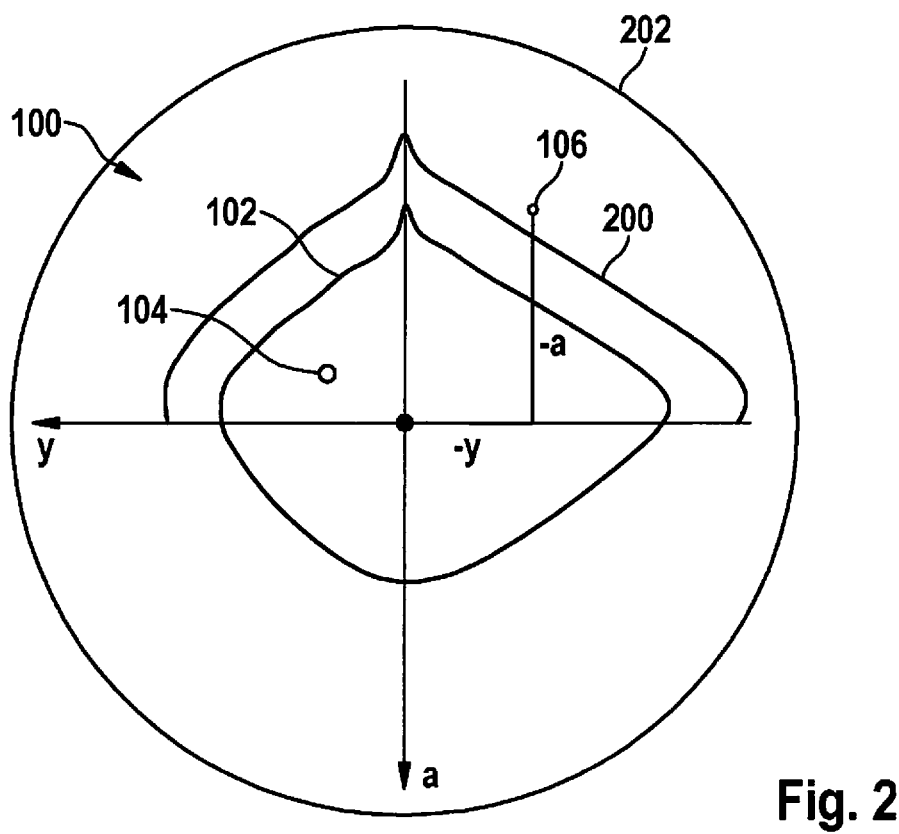
FIG. 2 shows a representation of a driving-dynamics profile of a driver of a motorcycle and an intervention boundary according to one exemplary embodiment.

FIG. 2 shows a representation of a driving-dynamics profile 100 of a driver of a motorcycle and an intervention boundary 200 according to one exemplary embodiment. Driving-dynamics profile 100 corresponds essentially to the driving-dynamics profile in FIG. 1. In addition, intervention boundary 200 for an emergency braking assist of the motorcycle is shown here, as well. The intervention boundary lies outside of curve 102. In this context, intervention boundary 200 corresponds to a boundary of surface 104 scaled by a scaling factor of approximately 20% to 25%.

If an emergency-braking function is furnished with fixed threshold values, the driver-specific behavior patterns represented by driving-dynamics profile 100 are not taken into consideration. In the approach presented here, intervention boundary 200 adapted to the driver is defined by a learning function of the braking-system electronics from sensor data of the motorcycle.

This intervention boundary 200 may also be carried along as a sliding value relative to instantaneous driving conditions. In this case, for example, intervention boundary 200 may enclose a smaller surface, if the instantaneous driving conditions include fewer inclined-position values y and/or acceleration values a.

The assistance function is individualized by the approach presented here. As a result, expectations of the driver are fulfilled better than with fixed values. This also holds true for the controllability of the vehicle, which must always be taken into account. The ABS boundary may be adapted. The sensing of the inclined position and the utilization of the inclined position offer the possibility of using the function in curves, as well. With his profile, the driver has communicated to the system, which intervention is able to be handled by the driver.

If instantaneous driving state 106 lies on or outside of intervention boundary 200, the driver assistance system intervenes.

In one exemplary embodiment, the driver assistance system increases a setpoint value for a brake pressure, when instantaneously detected driving state 106 lies outside of intervention boundary 200. In that case, the brake pressure may be increased up to a physical boundary 202. As of physical boundary 202, the tires of the two-wheeled vehicle begin to skid. Outside of physical boundary 202, an antilock braking system ABS of the two-wheeled vehicle intervenes, in order to maintain steerability of the two-wheeled vehicle.

Physical boundary 202 is represented approximately by a Kamm circle around the origin. Physical boundary 202 shows that given constant static friction, with increasing inclined position y, less and less acceleration force is able to be transmitted in the direction of travel, without going into a skid. Depending on observation, physical boundary 202 may have an elliptical form. Driving-dynamics profile 100 lies within physical boundary 202. In the approach presented here, an existent distance from driving-dynamics profile 100 up to physical boundary 202 is bridged, when driving state 106 crosses intervention boundary 200.

In one exemplary embodiment, driving-dynamics profile 100 is updated continuously. In so doing, instantaneous driving states 106 are recorded and filtered using a processing specification. For example, driving states 106 may be integrated. In that case, driving states 106 are recorded, so long as the driver assistance system does not invalidate them. Envelope curve 102 shifts owing to the updating. For instance, surface 104 becomes smaller in response to poor road conditions. At the same time, a form of envelope curve 102 remains similar or essentially the same. Likewise, learning progress, that is, a gain in driving skill, is reflected by the updating in driving-dynamics profile 100.

When the motorcycle is put into operation, intervention boundary 200 may be set to a factory setting, until a driving-dynamics profile 100 of the driver has been generated. For example, a meaningful driving-dynamics profile 100 may be generated after a good quarter of an hour of free travel. In particular, the factory setting may lie close to the physical boundary and with time, be brought closer to the developing driving-dynamics profile, in order to ensure that intervention boundary 200 is located with certainty between physical boundary 202 and envelope curve 102.

Finally, it should be pointed out that terms such as "having", "including", etc. do not rule out other elements or steps, and terms such as "one" or "a" do not exclude multiplicity. Reference numerals in the claims are not to be regarded as restricting.

What is claimed is:

1. A method for operating a driver assistance system for a two-wheeled vehicle as a function of (a) a driver-specific driving-dynamics profile that reflects a relationship between inclined-position values at which a driver of the two-wheeled vehicle drove in the past and acceleration values at which the driver drove at the same time and (b) an instantaneous driving state that is characterized by an instantaneously acquired acceleration value and an instantaneously acquired inclined-position value, the method comprising:
   when there is a deviation of (a) a combination of the instantaneously acquired acceleration value and the instantaneously acquired inclined-position value from (b) the relationship reflected by the driving-dynamics profile, determining whether or not to perform an intervention, the determination being made as a function of a degree of the deviation; and
   in response to the determination being to perform the intervention, performing the intervention via the driver assistance system.

2. The method of claim 1, wherein in the intervention, the driver assistance system intervenes when the instantaneous driving state represents an emergency situation, the emergency situation being identified by a driving state recognizable as outlier in comparison to the driving-dynamics profile.

3. The method of claim 1, further comprising:
   generating the driving-dynamics profile of the driver using acceleration values and inclined-position values acquired during intervention-free travel.

4. The method of claim 1, wherein in the intervention, the driver assistance system intervenes as a function of an instantaneous road condition, the road condition representing an anticipated coefficient of friction between wheels of the two-wheeled vehicle and the roadway.

5. The method of claim 4, wherein in the intervention, the road condition is determined using the driving-dynamics profile, an occurrence frequency of driving states being evaluated in terms of the driving-dynamics profile for the determination.

6. The method of claim 1, wherein in the intervention, the driver assistance system controls a brake system of the two-wheeled vehicle, a default value being provided for a brake pressure of the brake system as a function of the driving-dynamics profile and the driving state.

7. The method of claim 6, wherein in the intervention, the default value is increased when the instantaneously acquired acceleration value is greater than an intervention boundary, specific to the driving-dynamics profile, for the instantaneously acquired inclined-position value.

8. The method of claim 6, wherein in the intervention, the default value is increased up to an instantaneous ABS-control boundary value.

9. The method of claim 1, wherein the intervening is performed in response to the degree of the deviation being greater than a threshold that varies depending on a current environmental condition of the vehicle.

10. The method of claim 9, further comprising identifying what the current environmental condition of the vehicle is based on the driving-dynamics profile.

11. The method as recited in claim 1, wherein a value of the degree required for the determination to be to perform the intervention changes depending on a determined current driving condition.

12. The method as recited in claim 11, wherein the current driving condition is a current driving behavior.

13. The method of claim 1, wherein:
the driving-dynamics profile is generated by:
plotting a plurality of points in a graph, each point being defined by a combination of (1) a respective one of the inclined-position values and (2) a respective one of the acceleration values; and
ascertaining a curve that envelops a surface formed by the plotted points; and
the intervention is performed as a function of the deviation of a plot point formed by a combination of the instantaneously acquired acceleration value and the instantaneously acquired inclined-position value from an interior of the curve.

14. The method of claim 13, wherein the curve is ascertained by a statistically selected subset of the plotted points.

15. The method of claim 13, wherein the curve is a smoothed envelope curve.

16. The method as recited in claim 13, further comprising changing a size of the curve, without changing a shape of the curve, depending on a detected change in a driving condition.

17. The method as recited in claim 13, further comprising updating the driving-dynamics profile over time based on detecting new values forming new plot points of the driving-dynamics profile, wherein, in the updating, different detected values are differently weighted for affecting the curve depending on an age of the detected values.

18. The method of claim 13, wherein the intervention is performed in response to the deviation exceeding a threshold deviation.

19. The method of claim 18, wherein the threshold deviation varies depending on a current environmental condition of the vehicle.

20. The method of claim 19, further comprising identifying what the current environmental condition of the vehicle is based on the driving-dynamics profile.

21. The method of claim 18, wherein the threshold deviation is defined by scaling the curve by a scaling factor.

22. The method of claim 21, wherein the scaling factor is varied according to a current environmental condition of the vehicle.

23. An apparatus for operating a driver assistance system for a two-wheeled vehicle, comprising:
a device configured for operating the driver assistance system for the two-wheeled vehicle as a function of (a) a driver-specific driving-dynamics profile that reflects a relationship between inclined-position values at which a driver of the two-wheeled vehicle drove in the past and acceleration values at which the driver drove at the same time and (b) an instantaneous driving state that is characterized by an instantaneously acquired acceleration value and an instantaneously acquired inclined-position value, wherein the operation includes: when there is a deviation of (a) a combination of the instantaneously acquired acceleration value and the instantaneously acquired inclined-position value from (b) the relationship reflected by the driving-dynamics profile, determining whether or not to perform an intervention, the determination being made as a function of a degree of the deviation; and
in response to the determination being to perform the intervention, performing the intervention by controlling the driver assistance system.

24. A non-transitory computer readable medium on which is stored program code that is executable by a processor and that, when executed by the processor, causes the processor to perform a method for operating a driver assistance system for a two-wheeled vehicle as a function of (a) a driver-specific driving-dynamics profile that reflects a relationship between inclined-position values at which a driver of the two-wheeled vehicle drove in the past and acceleration values at which the driver drove at the same time and (b) an instantaneous driving state that is characterized by an instantaneously acquired acceleration value and an instantaneously acquired inclined-position value, the method comprising:
when there is a deviation of (a) a combination of the instantaneously acquired acceleration value and the instantaneously acquired inclined-position value from (b) the relationship reflected by the driving-dynamics profile, determining whether or not to perform an intervention, the determination being made as a function of a degree of the deviation; and
in response to the determination being to perform the intervention, performing the intervention by controlling the driver assistance system.

25. The computer readable medium of claim 24, wherein in the intervention, the driver assistance system intervenes as a function of an instantaneous road condition, the road condition representing an anticipated coefficient of friction between wheels of the two-wheeled vehicle and the roadway.

26. A method for operating a driver assistance system for a two-wheeled vehicle, the method comprising:
determining a current environmental state of the vehicle based on a combination of an instantaneously acquired acceleration value and an instantaneously acquired inclined-position value at which a driver is currently driving the vehicle forming a plot point that is outside of a curve of a driver-specific driving-dynamics profile that is drawn about a cloud of plot points that each reflects a respective combination of a respective inclined-position value at which the driver of the two-wheeled vehicle drove in the past and a respective acceleration value at which the driver drove at the same time as the respective inclined-position value of the respective combination; and
intervening, via the driver assistance system, as a function of (a) the current environmental state of the vehicle and (b) a comparison of an instantaneous driving state to the driver-specific driving-dynamics profile.

\* \* \* \* \*